United States Patent Office.

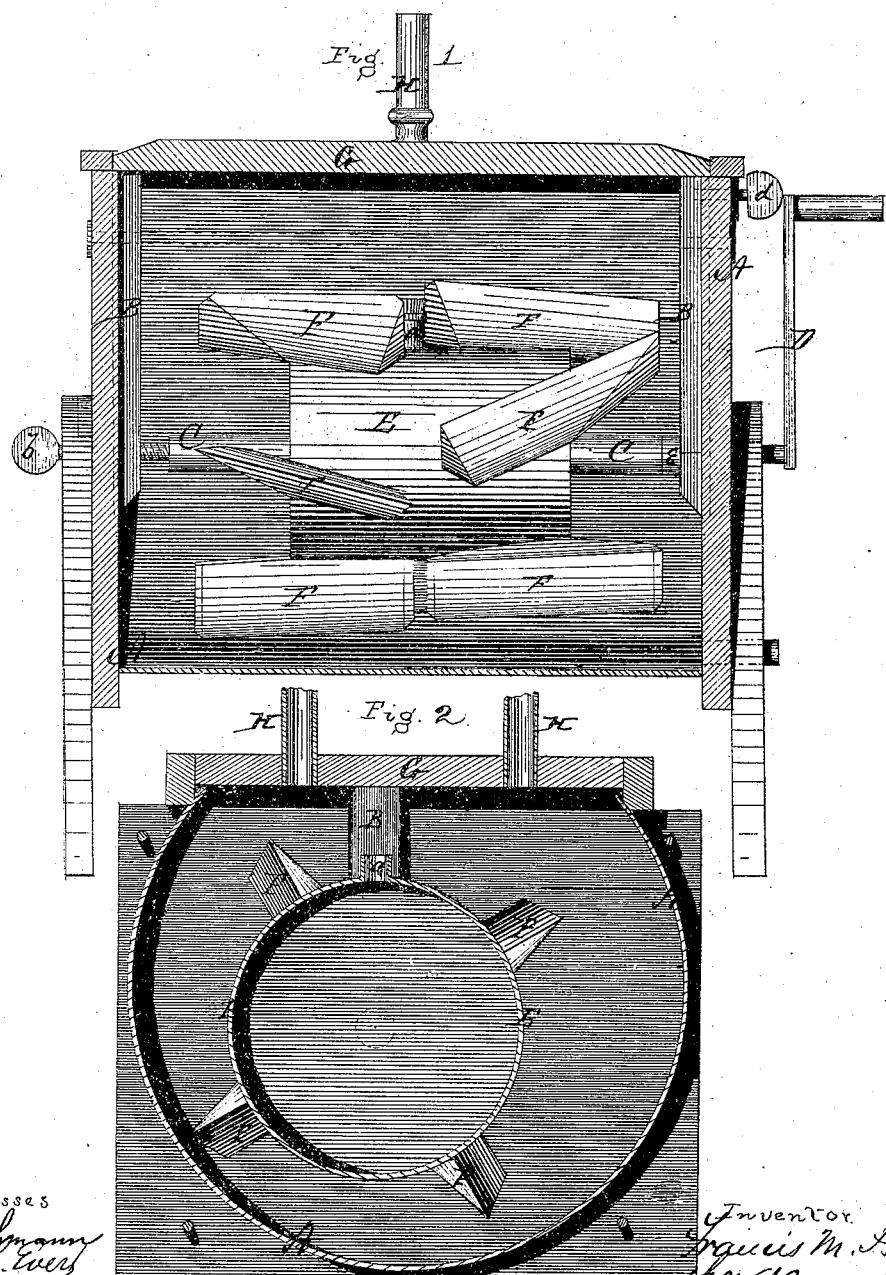

FRANCIS M. HARRIS, OF WINNAMAC, INDIANA.

Letters Patent No. 104,304, dated June 14, 1870.

IMPROVEMENT IN CHURNS.

The Schedule referred to in these Letters Patent and making part of the same.

*To all whom it may concern:*

Be it known that I, FRANCIS M. HARRIS, of Winnamac, in the county of Pulaski and in the State of Indiana, have invented certain new and useful Improvements in Churns; and do hereby declare that the following is a full, clear, and exact description thereof, reference being had to the accompanying drawing and to the letters of reference marked thereon making a part of this specification.

The nature of my invention consists in the construction and general arrangement of a churn, as will be hereinafter fully set forth.

In order to enable others skilled in the art to which my invention appertains to make and use the same, I will now proceed to describe its construction and operation, referring to the annexed drawing, in which—

Figure 1 is a longitudinal vertical section, and
Figure 2 is a transverse vertical section of my improved churn.

A represents a churn of any suitable dimensions, having its bottom and sides curved, as shown in fig. 2, and its ends straight.

In the ends of the churn are placed two upright slides B B, which project into the churn, and are placed a little to one side.

In these slides a shaft, C, has its bearings, which shaft is turned by a crank, D, from the outside.

On the shaft C is a cylinder, E, which is provided with an opening, a, and has, on its outer side or circumference, two series of fans, F F, placed obliquely, and extending beyond the ends of the cylinder. The fans F F are vertical on one side, but inclined on the other, and their ends are also inclined, as seen in fig. 1.

The cylinder E is used for tempering the milk, by putting hot or cold water in it. It is constantly moving in the midst of the cream, instead of pouring hot water in the cream and immediately scalding the cream, as is now usually done.

In turning the cylinder to the right, the construction of the fans F F cause them to break the cream and draw it around the cylinder, thus keeping it at a suitable temperature.

In gathering the butter, turn backward, when the fans will gather every particle into lumps, and in turning the cylinder the fans raise out of the milk, and the butter slides off the fans, and drops between the ends of the cylinder and sides or ends of the churn. When the butter is gathered, turn the set-screw $b$, which holds one end of the shaft C, when the cylinder can be readily removed and cleaned.

In preparing the churn, fill the cylinder with warm water, and place it in the churn, then pour the cream in, and turn steady till the cream breaks. Then take the warm water out and put in cold water, and turn to the right till the butter is ready. Then turn backward slowly, and it will draw the butter round to each end of the cylinder in nice rolls. Then raise the cylinder and take out the butter, when the milk will be pure and free of water, and the butter will be of a nice color.

The slides B B, projecting into the churn, form additional breakers for the cream. As above mentioned, one end of the shaft C is held or pivoted by means of the set screw $b$, while the other end passes through the slide B. The slide on this side is made in two parts, the lower part being stationary, forming the lower half of the bearing for the shaft, while the upper half can be slid out at pleasure. This upper half is held by a set-screw, $d$, as seen in fig. 1.

The shaft C is at this end provided with a roller or leather washer, $e$, which is tightened by the slide, and keeps every drop of cream in, that finds its way to the washer.

The cylinder E is, as seen in fig. 2, not placed in the center of the churn, but more to one side, in order that when gathering, the fans may press the butter against the side and press it into rolls.

The churn A itself is made in a very simple, but still durable and substantial manner. The end pieces are provided with curved grooves, in which are inserted the edges of the curved bottom, which also forms the sides of the churn. The end pieces are then connected by bolts and screws. The lid G is provided with two air-tubes, H H.

Having thus fully described my invention,
What I claim as new, and desire to secure by Letters Patent, is—

1. The hollow cylinder E, provided with the tube $a$, for the insertion of a tempering fluid and wings F F, and connected to the shaft C, to operate substantially as set forth.

2. The combination and arrangement of the churn A, slides B B, shaft C, cylinder E, and fans F F, all substantially as and for the purposes herein set forth.

In testimony that I claim the foregoing, I have hereunto set my hand this 28th day of August, 1869.

FRANCIS M. HARRIS.

Witnesses:
GEO. BURSON,
J. G. BAYLES.